March 25, 1952  J. GILLIES ET AL  2,590,529
FUMIGATING COMPOSITIONS
Filed Dec. 16, 1948

Inventors
JOHN GILLIES
JOHN ROWE

Cushman, Darby & Cushman
Attorneys

Patented Mar. 25, 1952

2,590,529

UNITED STATES PATENT OFFICE 2,590,529

FUMIGATING COMPOSITIONS

John Gillies, Ardrossan, and John Rowe, Irvine, Scotland, assignors to Imperial Chemical Industries Limited, a corporation of Great Britain Application December 16, 1948, Serial No. 65,706
In Great Britain March 3, 1948

11 Claims. (Cl. 167—40)

The present invention relates to fumigating compositions and more particularly to the provision of improved fumigating compositions for the thermal production of fumes of pest control compounds as for example of pesticidal or insect-repellant compounds that are capable of vaporisation when suitably heated.

The invention is valuable for the purpose of fumigating with combustible pesticidal or insect-repellant compounds, or pesticidal or insect-repellant compounds easily decomposed when overheated. The invention, for instance, facilitates the economical production of a fume comprising an aerosol of the condensed vapour of a pesticidal or insect-repellant compound which can deposit on the bounding surfaces of a closed space in which the fume is generated so as to produce a thin layer of the pesticidal or insect-repellant compound that will be active after the atmosphere is clear of the actual fumes.

One example of a pesticide capable of depositing such a layer when a suitable fumigation method is applied to volatilise it, is the very powerful insecticide gamma hexachlorocyclohexane. A further example is the powerful insecticide alpha-alpha-bis-(parachlorophenyl) beta-beta-beta-trichloroethane. Both insecticides can be applied in the form of a smoke by volatilisation from hot plates or by other heating methods.

The term "pest control compound" is intended to cover, for example, insecticides, fungicides, bactericides, and rodenticides.

In British Specification No. 584,853, there are described and claimed inter alia compositions of matter suitable for developing on combustion an aerosol having pest control properties comprising a solid combustible material together with a quantity of benzene hexachloride insufficient to render the composition incombustible. If desired the said compositions may include a highly oxygenated compound capable of promoting the combustion of the combustible material. By way of example it is disclosed that a suitable composition may comprise between 30% and 35% of crude benzene hexachloride, 45% to 50% of potassium nitrate, the remainder being sawdust.

We are also aware that it has been disclosed to provide a combustible mixture for the generation of pressure gas, nitrogen gas or heat constituted by ammonium nitrate and animal charcoal and if desired by the addition of other kinds of charcoal. It is stated that the gas generated can be used for the destruction of vermin and it is also stated that the combustible mixtures can be made, for example, by mixing together in a state of fine division about 15 parts by weight of blood charcoal and 85 parts by weight of ammonium nitrate.

The object of the present invention is to provide new or improved fumigating compositions which facilitate the effective vaporisation of pesticides or insect-repellant compounds.

Figure 1:
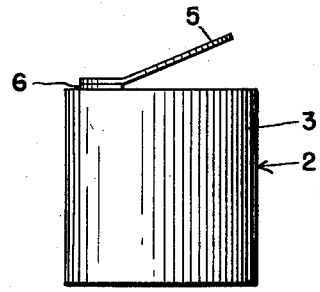
Figure 1 is a side elevational view of a cartridge containing the insecticidal compositions of this invention.
Figure 2:
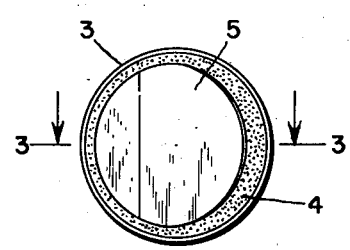
Figure 2 is a plane view of Figure 1.
Figure 3:
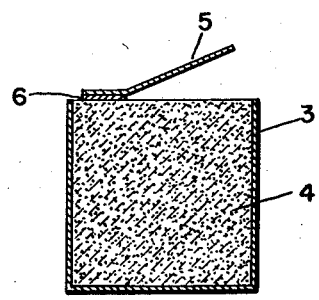
Figure 3 is a central vertical section on line 3—3 of Figure 2.
Figure 4:
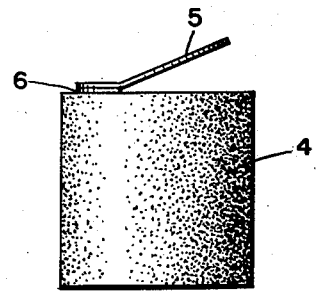
Figure 4 is a side elevational view of a pellet form of insecticidal composition of this invention which may be inserted in the cartridge of Figure 1.

It has now been found that it is not possible to make satisfactory fumigating compositions capable of giving a self-sustained thermal reaction from ammonium nitrate and charcoal containing an economically desirably high proportion of a thermally vaporisable pesticidal or insect-repellant compound by homogeneously mixing together the said three ingredients, whatever the relative proportions of the ammonium nitrate and charcoal, as the temperature generated during such a thermal reaction is so high as to bring about substantial decomposition of the pesticidal or insect-repellant compound.

On the other hand it has been found that it is possible to make fumigating compositions containing pesticidal or insect-repellant compounds which can be effectively vaporised from said compositions if these pesticidal or insect-repellant compounds are admixed with grains, preferably dry, comprising charcoal and ammonium nitrate formed by milling ammonium nitrate and charcoal together in the presence of a small quantity of water, preferably followed by subsequent drying of the homogeneous mass thus obtained.

According to the present invention the fumigating compositions consist of a mixture comprising a thermally vaporisable pesticidal or insect-repellant compound and grains, preferably dry, comprising ammonium nitrate and charcoal in which grains the ammonium nitrate is at least partly absorbed by the charcoal and in which the ratio of ammonium nitrate to charcoal is preferably 65–80 parts by weight ammonium nitrate and 35–20 parts by weight charcoal, and in which mixture the quantity by weight of said pesticidal or insect-repellant compound is insufficient to render the said grains of the compositions incapable of undergoing a self-sustained thermal reaction and is preferably between 40 and 55 parts per 100 parts of said mixture. Stated differently, the amount of ammonium nitrate present must be sufficient to undergo self-sustained thermal decomposition and thereby vaporize the pesticidal or insect-repellant compound.

According to the present invention the process for the production of fumigating compositions consisting of a mixture comprising a thermally vaporisable pesticidal or insect-repellant compound, ammonium nitrate and charcoal comprises admixing the thermally vaporisable pesticidal or insect-repellant compound with grains, preferably dry, comprising charcoal and ammonium nitrate formed by milling these two substances together in the presence of water preferably followed by subsequent drying of the mass thus obtained.

Preferably the ratio of ammonium nitrate to charcoal lies between 65 to 35 and 80 to 20 respectively. It will thus be seen that there is insufficient ammonium nitrate present to bring about the oxidation of all of the charcoal even to carbon monoxide. It is so far not possible to state whether the charcoal is in any way oxidised by the ammonium nitrate but it would seem that there is a slight loss of charcoal during the thermal reaction of the ammonium nitrate. It is probable that in the main the thermal reaction of the ammonium nitrate-charcoal grains consists of a thermal decomposition of the ammonium nitrate.

It is preferable to introduce as much of the pesticidal or insect-repellant compound as possible into the fumigating compositions both on grounds of economy and because the presence of the insecticidal or insect-repellant compound cools the fumigating compositions undergoing thermal change.

To assist ignition of the fumigating compositions particularly if these compositions are employed as small charges it is desirable to include a reagent aiding ignition as for example potassium nitrate or ammonium bichromate. If potassium nitrate is included it is most desirable to incorporate it into the grains of ammonium nitrate and charcoal during the milling action. If, however, ammonium bichromate is included this reagent is preferably mixed with the grains comprising ammonium nitrate and charcoal after their formation. In order to lower the temperature of the self-sustained thermal reaction of the grains it is also desirable to include an ingredient china clay or common salt which is preferably incorporated into the grains towards the end of the milling action.

In the drawings is shown one form of a cartridge including an insecticidal composition indicated as 2 which has a casing 3 surrounding the insecticidal composition 4 and which is open at the top end thereof. To the insecticidal composition 4 in the casing 3 on the top surface thereof is attached, for example, a primer in the form of a flap 5 by means of an adhesive composition 6. The primer may advantageously consist of wood pulp impregnated with potassium nitrate. The walls of the casing 3 may be made of paper, cellophane or other suitable wrapping material.

Such cartridges made up from the compositions and provided with a casing may advantageously be employed, and such cartridge may advantageously include a small piece of fuse or of quick match composition or other igniting composition in place of the flap 5 as described supra in contact with the fumigating charge in order to facilitate the ignition of the latter from an ordinary domestic friction match, electric fusehead or other source of ignition. The fumigating charge may be in loose powder or compact form, and for its production in compact form the pulverulent mixture of ingredients may be subjected to compression. Alternately the mixture may be made into compact form with the aid of a binder or bonding agent, and may be extruded or moulded into form. Preferably the fumigating charge may conveniently be lightly compacted in a cartridge having a paper, cellophane, or other suitable wrapper or envelope.

When a local portion of the charge is heated by the ignition of the quick match composition or the like or the piece of fuse or by touching it with a piece of hot metal or the like a gas is evolved accompanied by the evolution of the pesticidal fume and unaccompanied by flame. This evolution of gas due to the thermal decomposition of the ammonium nitrate and/or due to the interaction of the ammonium nitrate and the charcoal will propagate itself through the charge. The fumigating charges provided according to the invention are therefore both safe and convenient for application in confined space.

The invention is illustrated by the following examples in which the parts are by weight.

The hexachlorocyclohexane employed consists of a mixture of the four isomers, alpha, beta, gamma and delta, the gamma isomer, the active insecticide, being present to the extent of about 12–16 per cent. The alpha-alpha-bis-(parachlorophenyl) beta-beta-beta-trichloroethane employed is the commercial product containing normally about 80% of the active insecticide.

*Example I*

A fumigating composition according to the invention having the following composition: ammonium nitrate 30 parts by weight, charcoal 13 parts by weight, potassium nitrate 2 parts by weight, china clay 10 parts by weight, hexachlorocyclohexane 45 parts by weight is suitable for pellet type generators and is prepared as follows:

The ammonium nitrate (free from china clay), charcoal (of 40 mesh fineness), and potassium nitrate are milled with 3% of water in an edge runner mill for 20 minutes. The china clay is added to the mixture in the mill and the whole is milled for another five minutes. The charge is withdrawn sieved through a 16 mesh sieve, dried at 40 to 50° C. on trays and is then mixed with the hexachlorocyclohexane either by box mixer or through a Manesty mixer.

Pellets are made from this mixture by pressing in a mould at 2¼ tons/square inch.

The pellets are provided with a primer consisting of woodpulp impregnated with potassium nitrate attached to the pellet by an adhesive. The primer is in the form of a flap.

These pellets give a self-sustained reaction at a temperature of about 570° C.

*Example II*

A fumigating composition according to the invention of the following composition: ammonium nitrate 29.4 parts by weight, charcoal 12.6 parts by weight, potassium chloride 3 parts by weight, sodium chloride 10 parts by weight, ammonium bichromate 5 parts by weight, hexachlorocyclohexane 40 parts by weight, is suitable for pellet type generators and is prepared as follows:

The ammonium nitrate and charcoal are milled with 3% water. The charge thus obtained is sieved and dried and the dry grains are then mixed with the other ingredients.

The pellets made from this composition are provided with a primer similar to that described in Example I.

These pellets give a self-sustained reaction at a temperature of about 485° C.

*Example III*

A fumigating composition according to the invention of the following composition: ammonium nitrate 26 parts by weight, charcoal 11 parts by weight, ammonium dichromate 3 parts by weight, china clay 10 parts by weight, hexachlorocyclohexane 50 parts by weight is suitable as a loose powder composition and is prepared as follows:

The ammonium nitrate and charcoal are milled together for 20 minutes with 3% water. China clay is then added and the milling of the mixture is continued for another 5 minutes. The material is sieved through a 16 mesh sieve and dried on trays at 40° to 50° C. The remaining ingredients are then added and the whole mixed either in a box mixer or in a Manesty mixer. The product thus obtained is then filled into suitable cans and the lids are hermetically sealed.

The fumigating composition gives a self-sustained reaction at a temperature of about 490° C.

*Example IV*

A fumigating composition according to the invention of the following composition: ammonium nitrate 27 parts by weight, charcoal 11.6 parts by weight, potassium nitrate 1.8 parts by weight, china clay 9.6 parts by weight, hexachlorocyclohexane 50 parts by weight is suitable as a loose powder composition and is prepared as in Example I.

The fumigating composition gives a self-sustained reaction at a temperature of about 520° C.

*Example V*

A fumigating composition according to the invention of the following composition: ammonium nitrate 28 parts by weight, charcoal 12 parts by weight, china clay 10 parts by weight, alpha-alpha-bis-(parachlorophenyl) beta-beta-beta-trichloroethane 50 parts by weight is suitable as a loose powder composition and is prepared as in Example I.

The fumigating composition gives a self-sustained reaction at a temperature of about 440° C.

*Example VI*

A fumigating composition according to the invention of the following composition: ammonium nitrate 29.4 parts by weight, charcoal 12.6 parts by weight, sodium chloride 15 parts by weight, potassium chromate 3 parts by weight, alpha-alpha-bis-(parachlorophenyl) beta-beta-beta-trichloroethane 40 parts by weight is suitable for pellet type generators and is prepared as in Example II.

These pellets give a self-sustained reaction at a temperature of about 560° C.

*Example VII*

A fumigating composition according to the invention of the following composition: pentachlorophenol 50 parts by weight, ammonium dichromate 3 parts by weight, china clay 10 parts by weight, ammonium nitrate 26 parts by weight, charcoal 11 parts by weight is suitable as a loose powder composition and is prepared as follows:

The ammonium nitrate and charcoal are milled together for 20 minutes with 3% water. China clay is then added and the milling of the mixture is continued for another 5 minutes. The material is sieved through a 16 mesh sieve and dried on trays at 40° to 50° C. The remaining ingredients are then added and the whole mixed either in a box mixer or in a Manesty mixer. The product thus obtained is then filled into suitable cans and the lids are hermetically sealed.

The fumigating composition gives a self-sustained reaction at a temperature of about 410° C.

We claim:

1. A fumigating composition comprising an admixture of a thermally vaporisable pesticidal compound and ammonium nitrate-charcoal grains formed by milling charcoal and ammonium nitrate together in the presence of water and thereby at least partially absorbing the ammonium nitrate by the charcoal, the amount of ammonium nitrate being insufficient to bring about the oxidation of all of the charcoal to carbon monoxide and sufficient to undergo self-sustained thermal decomposition and thereby vaporize said pesticidal compound.

2. A fumigating composition comprising an admixture of a thermally vaporizable pesticidal compound and ammonium nitrate-charcoal grains formed by milling charcoal and ammonium nitrate together in the presence of water and thereby at least partially absorbing the ammonium nitrate by the charcoal, the ratio of ammonium nitrate to charcoal in said grains being 65 to 80 parts by weight of ammonium nitrate to 35 to 20 parts by weight of charcoal, and said amount of ammonium nitrate being sufficient to undergo self-sustained thermal decomposition and thereby vaporize said pesticidal compound.

3. A fumigating composition comprising an admixture of a thermally vaporizable pesticidal compound and ammonium nitrate-charcoal grains formed by milling charcoal and ammonium nitrate together in the presence of water and thereby at least partially absorbing the ammonium nitrate by the charcoal, the ratio of ammonium nitrate to charcoal in said grains being 65 to 80 parts by weight of ammonium nitrate to 35 to 20 parts by weight of charcoal, and said thermally vaporizable pesticidal compound comprising between 40% and 55% of the total weight of said admixture.

4. A fumigating composition as set forth in claim 1 wherein the said grains of ammonium nitrate and charcoal are substantially dry.

5. A fumigating composition as set forth in claim 1 wherein an ignition aiding reagent is included.

6. A fumigating composition as set forth in claim 5 wherein the ignition aiding reagent is potassium nitrate which is incorporated into the grains of ammonium nitrate and charcoal during the milling action.

7. A fumigating composition as set forth in claim 5 wherein said ignition aiding reagent is ammonium dichromate which is admixed with the grains of ammonium nitrate and charcoal after their formation.

8. A fumigating composition as set forth in claim 1 wherein china clay is included.

9. A fumigating composition as set forth in claim 1 wherein sodium chloride is included.

10. A fumigating composition as set forth in claim 1 wherein the pesticidal compound is alpha-alpha-bis (parachlorophenyl) beta-beta-beta trichloroethane.

11. A fumigating composition as set forth in claim 1 wherein the pesticidal compound is hexachlorocyclohexane.

JOHN GILLIES.
JOHN ROWE.

REFERENCES CITED

The following references are of record in the file of this patent:

UNITED STATES PATENTS

| Number | Name | Date |
|---|---|---|
| 2,434,872 | Taylor et al. | Jan. 20, 1948 |
| 2,440,082 | Flanders et al. | Apr. 20, 1948 |
| 2,454,643 | Fordham et al. | Nov. 23, 1948 |

FOREIGN PATENTS

| Number | Country | Date |
|---|---|---|
| 15,852 | Great Britain | Mar. 15, 1906 |
| 584,853 | Great Britain | Jan. 24, 1947 |